Figure 1:
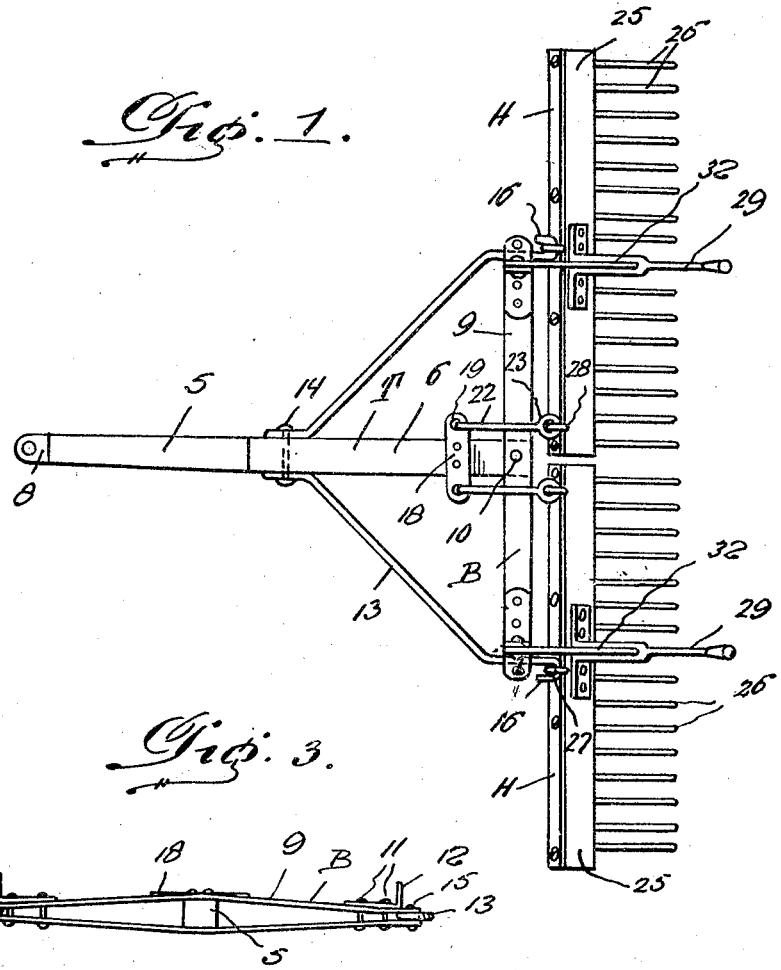

Oct. 19, 1926.  1,603,477

F. LE BEAU

FLEXIBLE HARROW

Filed May 3, 1926

Inventor
F. LeBeau

By Clarence A. O'Brien
Attorney

Patented Oct. 19, 1926.

1,603,477

UNITED STATES PATENT OFFICE.

FRED LE BEAU, OF MARSHALL, MINNESOTA.

FLEXIBLE HARROW.

Application filed May 3, 1926. Serial No. 106,462.

The present invention relates to a harrow of the surface type, and has for its principal object to provide an implement of this nature which may be attached behind a disk cultivator, grain drill, roller, or the like in order to perform disking and harrowing in one operation, without the need of added horse power.

Another important object of the invention is to provide a flexible surface harrow of this nature which is efficient and reliable in operation upon the soil for producing a smooth and mellow seed bed.

A still further very important object of the invention resides in the provision of a harrow of this nature which is exceedingly simple and light in its construction, inexpensive to manufacture, adjustable to afford different angular engagements of the tines with the ground, is strong, durable, easy to manipulate, not likely to easily become out of order, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 3:
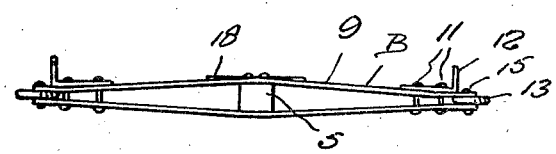
Figure 2:
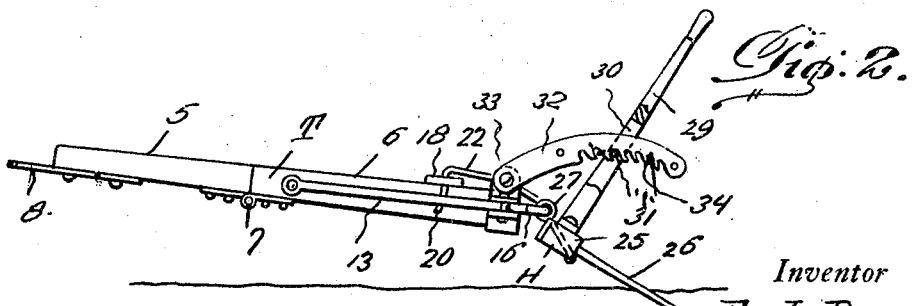

Figure 1 is a top plan view of the harrow embodying the features of my invention, Fig. 2 is a side elevation thereof, and Fig. 3 is a detail view of the cross beam.

Referring to the drawing in detail, it will be seen that the letter T denotes a tongue including a front section 5 and a rear section 6, these sections being hinged together at 7. On the front end of the forward section 5, there is mounted a clevis 8 in order that attachment may be mounted for draft purposes with a cultivator or the like.

A cross beam is indicated generally by the letter B and includes upper and lower rods 9 for receiving between their intermediate portions, the rear end of the sections 6 engaged therewith by a pin 10 or in any other preferred manner. The extremities of the rods 9 are fixed together by elements 11 which also hold in place brackets 12. Brace arms 13 are attached as at 14 to the forward end of the rear section 6, and between the extremities of the rods 9 at 15, the rear extremities of these brace rods 13 terminating in hooks 16.

A cross plate 18 is fixed to the section 6 in advance of the beam B, and has its extremities provided with apertures 19 receiving the hook ends 20 of links 22, the rear ends of which terminate in eyes 23. A pair of harrow implements is indicated by the letters H. Each implement includes a head 25 having a plurality of straight tines or teeth projecting therefrom. An eye 27 is mounted on the intermediate portion of each head 25 and engages one of the hooks 16. An eye 28 is mounted at the inner end of each head 25 and engages the eye 23. Cranks 29 are rigidly attached to the heads 25 to normally project upwardly and rearwardly therefrom. The lower ends of these cranks are bifurcated to form slots 30 across which extends pins 31. A pair of arcuate members 32, each have one of their ends pivoted as at 33 to one of the brackets 12. The members 32 extend through the slots 30 and have notches or teeth 34 engageable with pins 31.

It will thus be seen that by placing the pins 31 in the notches 34, that the angles of the harrow implements 8 may be changed in relation to the frame which is made up of the section 6, the braces 13, and the beam B.

Particular attention is directed to the ease with which the harrow implements may be attached to or detached from the frame. The structure is capable of being manufactured very cheaply and lightly without sacrificing its strength and durability. The structure will operate very efficiently to attain the ends desired, and the harrow implements may be readily adjusted as is desirable. The many desirable advantages and features of the present structure will be appreciated by those familiar with the class of agricultural machines to which the present application appertains, and the cooperation and coaction of the various parts is to be noted. The frame holds the harrow implements in order that they may freely flex with relation thereto, so that the maximum efficiency is attained.

The contrivance is designed as an ancillary tool or implement to be used in connection with and attached to the disk, grain drill, or roller, whereby the seed bed may be prepared and completed in one operation. The present invention is in the form of an attachment, which affords ease of assembly. The invention is adapted for use only with other implements and the structure affords the maximum flexibility and adaptability to all surfaces.

The present embodiment of the invention has been disclosed in detail since in actual practice, it attains the features of advantage enumerated as desirable in the statement of the invention and the above description. It is apparent that numerous changes in the details of construction, and in the combination and arrangement of parts may be resorted to without departing from the spirit or scope of the invention as hereinafter claimed, or sacrificing any of its advantages.

Having thus described my invention, what I claim as new is:—

1. An attachment of the class described including, in combination, a tongue formed in a pair of hinged sections, a cross beam comprising a pair of rods having their intermediate portions spaced to receive one end of the tongue therebetween, means fixing the tongue to the cross beam, brackets affixed to the cross beam, brace arms engaging the tongue and the ends of the cross beam and terminating in hooks to the rear of the cross beam, a pair of harrow implements each comprising a head and a plurality of teeth, an eye bolt on the center of the head engaged with one of the hooks, an eye bolt at one end of the head and a hook on the last mentioned eye bolt, a plate fixed to the tongue forwardly of the cross beam and having apertured ends for receiving the last mentioned hooks, a pair of arcuate members having a plurality of notches and having their ends pivotally engaged on the brackets, cranks rigidly extending from the heads of the harrow implements, and pins on the cranks for engaging the pivoted arcuate members.

2. An attachment of the class described including a frame having a pair of hooks extending rearwardly thereof, a plate on the frame having apertured ends, and a pair of harrow implements, each comprising a head, a plurality of teeth, an eye bolt on the center of the head engaged with one of the hooks, an eye bolt at one end of the head, a hook on the last mentioned eye bolt engageable with one end of the apertured plate, brackets on the frame, arcuate notch members pivoted to the brackets, cranks on the heads of the harrow implements, pins on the cranks, engageable by the arcuate members.

In testimony whereof I affix my signature.

FRED LE BEAU.